Aug. 24, 1948.　　　C. T. McGILL ET AL　　　2,447,520
ELECTRO-VOLUMETRIC CONTROL DEVICE FOR A WATER TREATING
DEVICE COMPRISING A MOTOR OPERATED VALVE MECHANISM
HAVING AN ELECTRICALLY CONNECTED TIME SWITCH
Filed July 9, 1943　　　　　　　　　　　　　　6 Sheets-Sheet 5

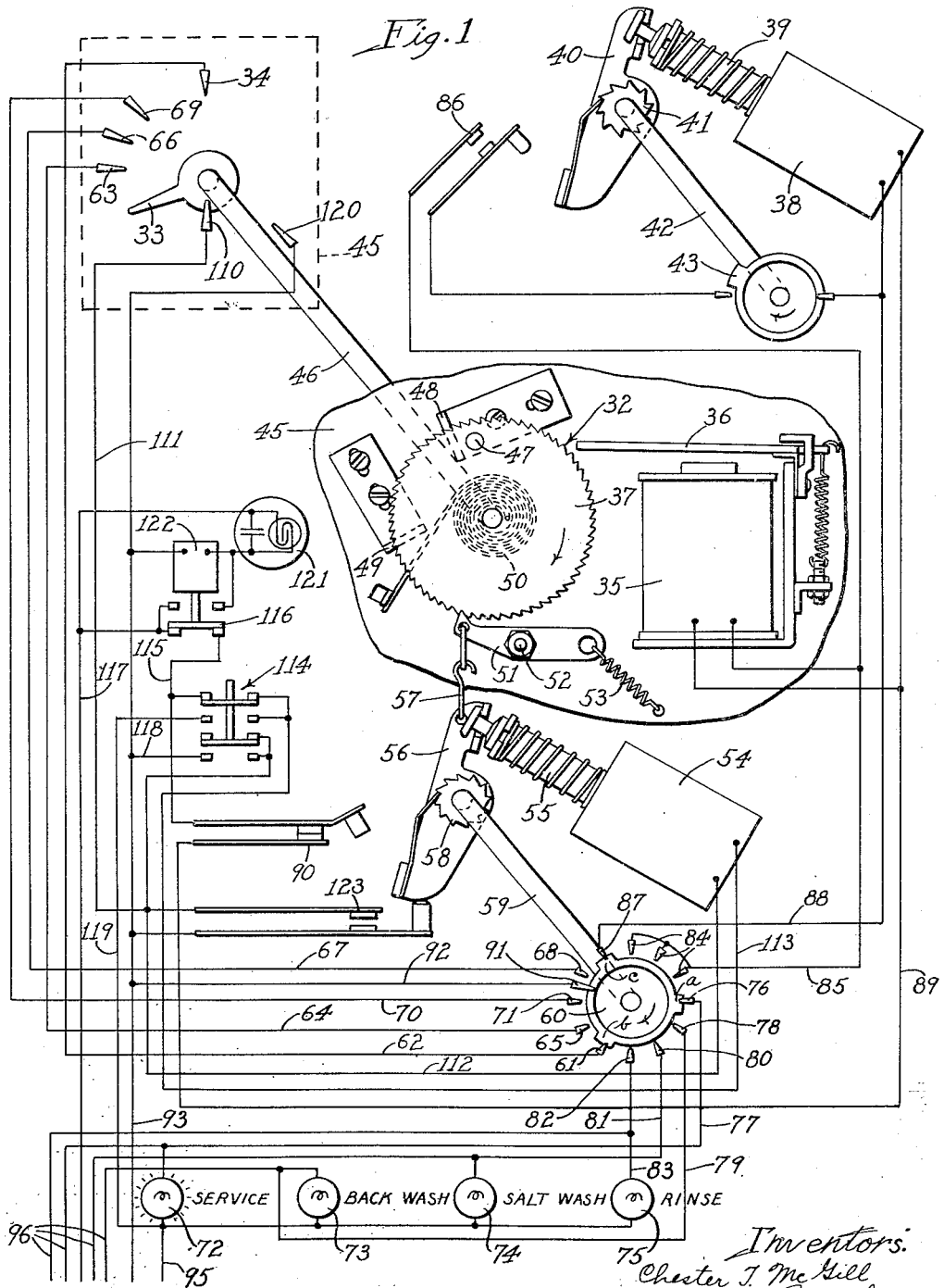

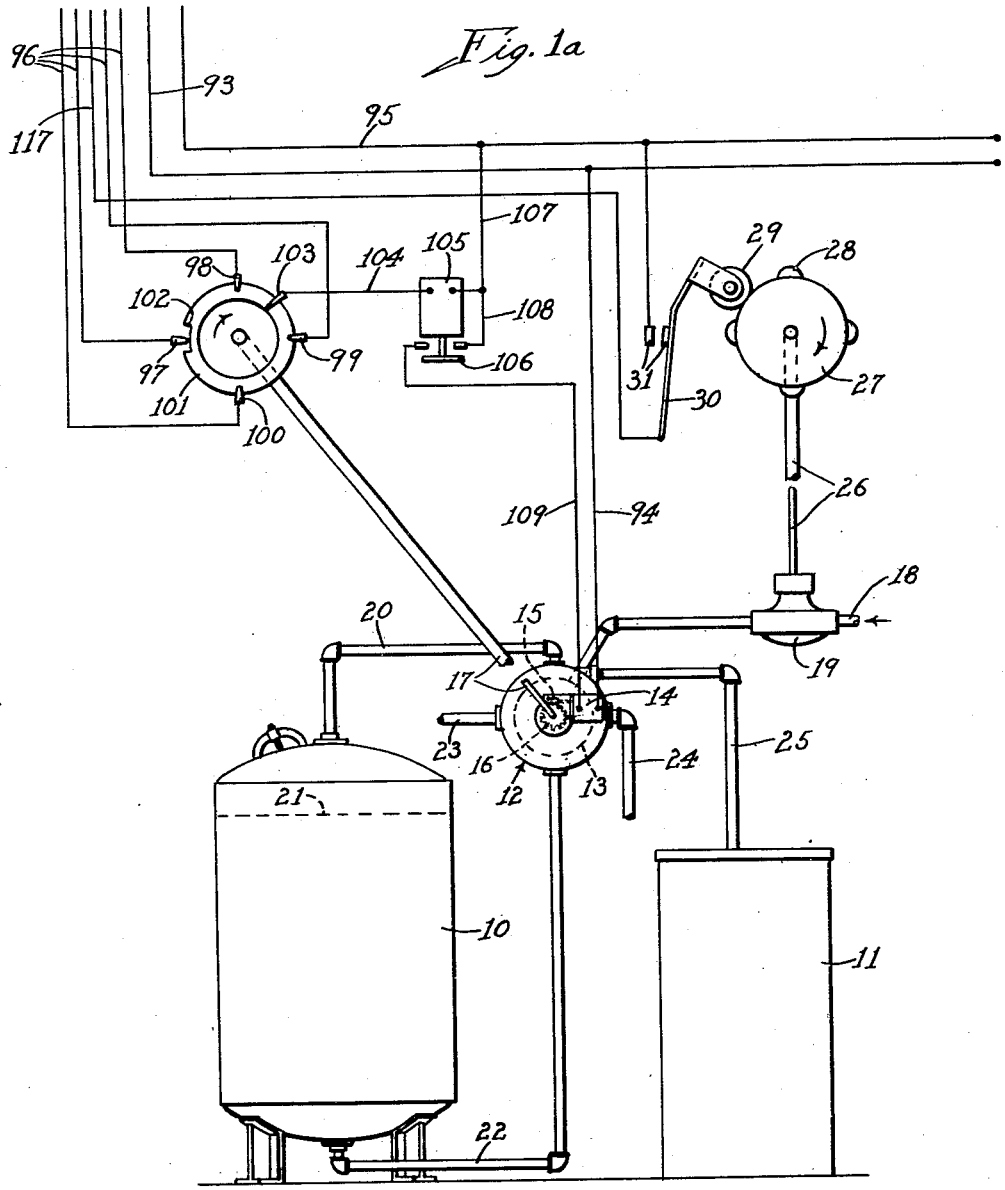

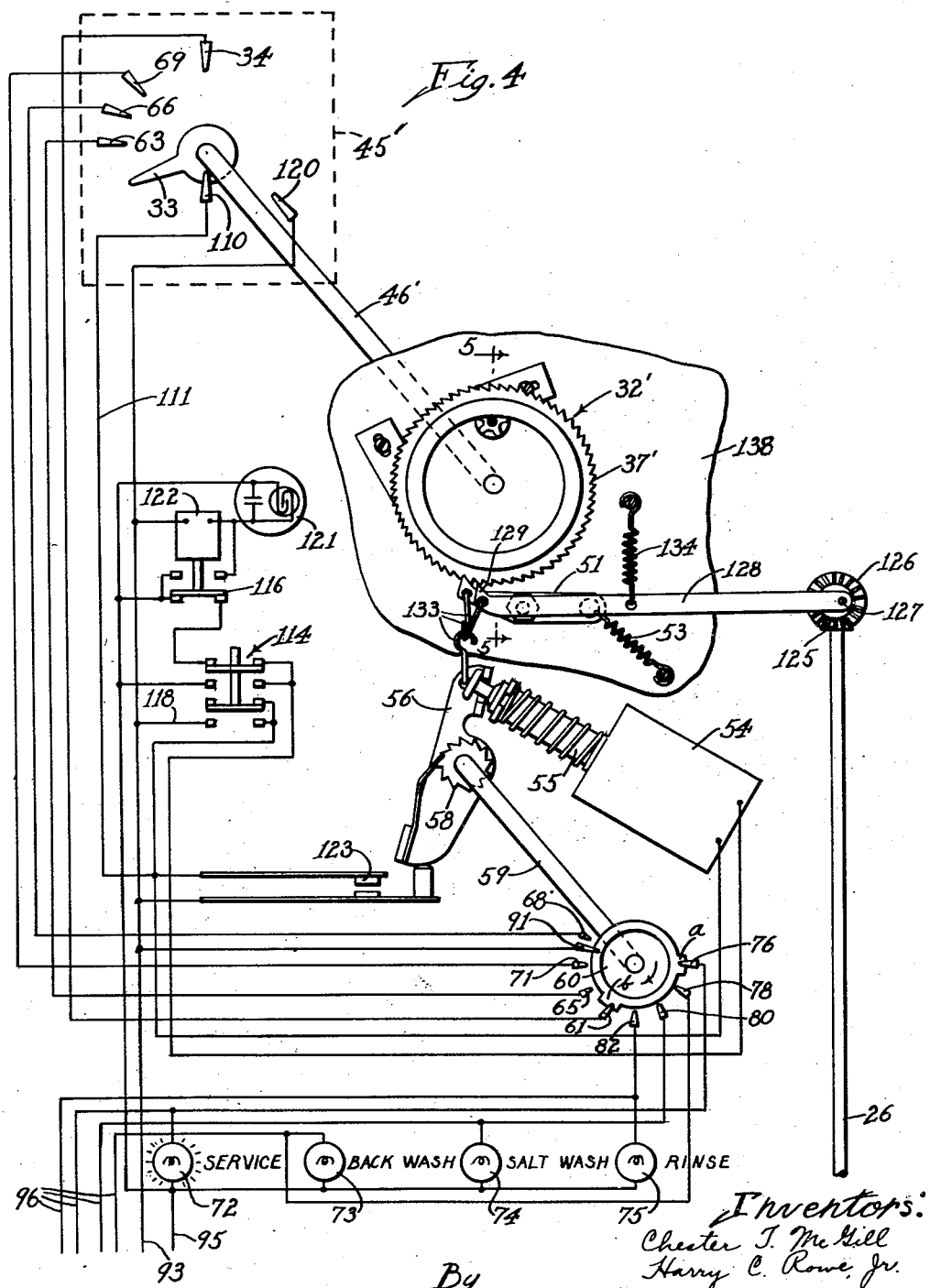

Fig. 4a

Inventors:
Chester T. McGill
Harry C. Rowe, Jr.
By
McCanna, Wintercorn & Morsbach Attys.

Aug. 24, 1948.   C. T. McGILL ET AL   2,447,520
ELECTRO-VOLUMETRIC CONTROL DEVICE FOR A WATER TREATING
DEVICE COMPRISING A MOTOR OPERATED VALVE MECHANISM
HAVING AN ELECTRICALLY CONNECTED TIME SWITCH
Filed July 9, 1943   6 Sheets-Sheet 6
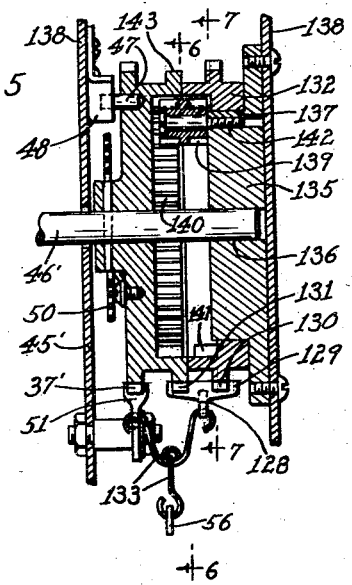
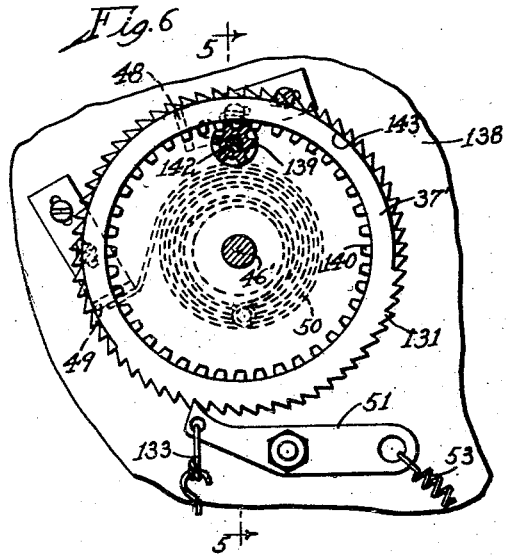
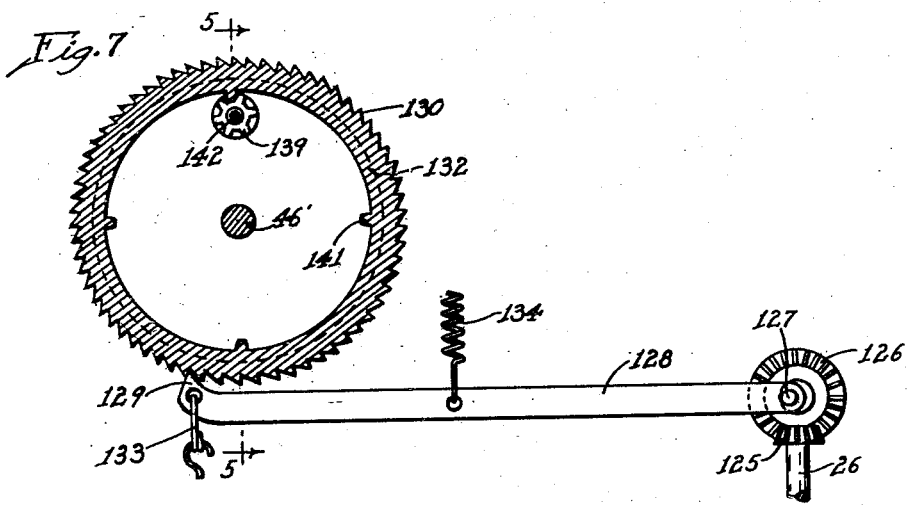

Patented Aug. 24, 1948

2,447,520

UNITED STATES PATENT OFFICE 2,447,520

ELECTROVOLUMETRIC CONTROL DEVICE FOR A WATER TREATING DEVICE COMPRISING A MOTOR OPERATED VALVE MECHANISM HAVING AN ELECTRICALLY CONNECTED TIME SWITCH

Chester T. McGill, Elgin, and Harry C. Rowe, Jr., Chicago, Ill., assignors to Elgin Softener Corporation, Elgin, Ill., a corporation of Illinois Application July 9, 1943, Serial No. 494,032

45 Claims. (Cl. 210—24)

This invention relates to a new and improved electro-volumetric control device especially designed and adapted for use in operating, automatically, according to the volume of water flowing, the service run, backwash, salt wash, and rinse, of a base exchange water softener, but usable also for other purposes, wherever a similar problem of similarly controlling or governing a number of phases of operation of a device is presented.

The principal object of our invention is to provide a device of the kind referred to which is simple and reliable and in which the different phases of the operation are effected automatically by a flow actuated device in predetermined relation to the flow of fluid therethrough without imposing any appreciable increase of load on said flow actuated device.

Another object of the present invention is to provide a device of the kind indicated in which impulses from a flow actuated device are transmitted by an advancing unit to a control panel provided with contact means which are readily adjustable and adapted to interrupt the movement of said advancing unit at predetermined points corresponding to the termination of different phases of operation, said advancing unit being provided with means for returning the same to starting position upon each of said interruptions.

Another object of our invention is to provide a device of the type indicated in which the advancing unit is combined with means adapted to reduce the total advancing movement of said unit for each phase of operation to amounts of one and the same order. Thus, for instance, in the case of a base exchange water softener, the duration of the service run is generally of an order many times that of each one of the other operational phases—days as compared with minutes—and in that case the object is to provide a device in which the large movement of the advancing unit representing the service run is reduced to the same order as the movements corresponding to the other phases of operation. This enables the use of a very simple control panel and simple means for returning the advancing unit to starting position upon each termination of a phase of operation.

In accordance with the last stated object we provide a simple intermediary or auxiliary advancing unit which receives an impulse from the flow actuated device for every unit of fluid flowing therethrough, but transmits an impulse to the main advancing unit only once for every predetermined number of impulses received. In that way any desired ratio may be provided and in the case of a water softener the same main unit is usable to record the backwash, salt wash, and rinse gallonage, and also the service run gallonage, if desired, despite the great difference in the gallonage for the service run as compared with the gallonage for either of the three other operations.

Still another object of our invention is to provide a mechanism of the kind mentioned which is primarily electro-volumetric but which is also designed to permit the initiation of one or more phases of its operation by other means than the flow of fluid if desired. Thus, for instance, in the case of a base exchange water softener, all phases except the backwashing may be controlled by the electro-volumetric mechanism, said backwashing phase, however, being initiated by a hardness tester such as the one disclosed in Patent 2,241,121 to Lee G. Daniels.

Another important object of our invention is to provide as part of the main advancing unit a rotatable contact, which is indexed step by step from a zero or starting position in accordance with the impulses given said main unit directly or indirectly by the flow actuated device, and the contact is arranged to engage terminals placed selectively at different positions spaced angularly from the zero or starting position of the contact, whereby to permit any desired variation, within reasonably wide limits, of the backwash gallonage, salt wash gallonage, and the rinse gallonage, as well as the service run gallonage. The service run gallonage is determined both by the setting of the terminal at a predetermined angularity with respect to the starting position of the contact and by the predetermined operating ratio between the auxiliary unit and the main unit.

A further object of our invention is to provide a mechanism of the kind mentioned in which the flow actuated device may, if desired, be employed for directly operating the main and auxiliary units, instead of operating the same by electrical impulses, whereby to make the invention universally applicable, regardless of whether the units to be controlled are or can be situated in close proximity to the flow actuated device or not.

Still another object of our invention is to provide a rotary valve which is arranged to be turned from one position to another by an electric motor, the circuit through which is completed when the rotatable contact forming a part of the main unit is advanced to the predetermined positions at the end of the service run, backwash, salt wash, and rinse. A valve position disk is turned with the valve and has brushes identified with the several valve positions slidably contacting the periphery thereof, and this disk has a notch in the periphery thereof which when the valve is turned to a predetermined position causes an interruption of the motor circuit, so as to leave the valve in the desired position until the motor circuit is again completed at the end of the next phase of softener operation.

The invention is illustrated in the accompanying drawings, in which—

Figs. 1 and 1a together constitute a complete electrical wiring diagram of the control device of our invention, showing the device diagrammatically as applied to a rotary valve for control of the operation of an automatic water softener;

Fig. 2 is a face view of the control panel for the device shown in Figs. 1 and 1a;

Figure 2:
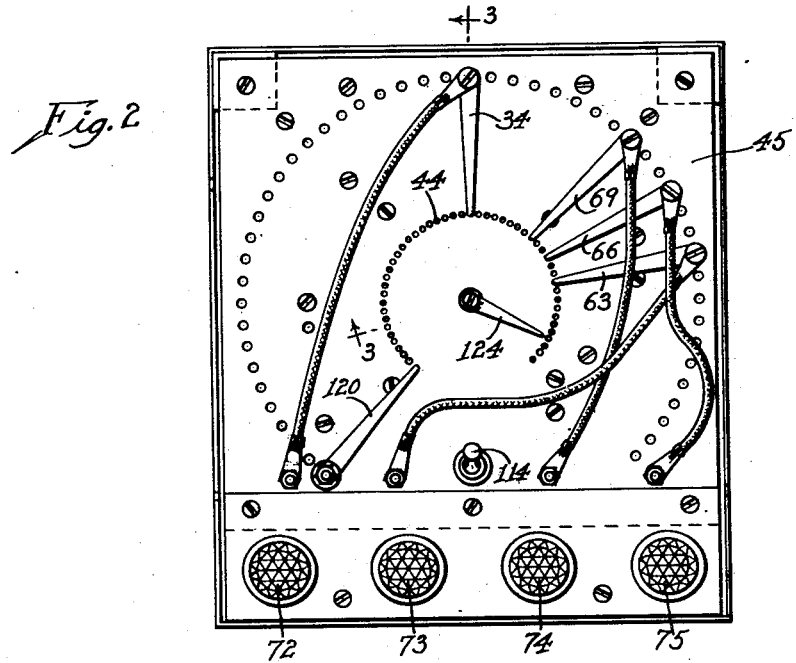

Figs. 4 and 4a are views similar to Figs. 1 and 1a illustrating a control device having a modified or alternative construction, and Figs. 5, 6, and 7 are enlarged views to better illustrate a portion of the device of Fig. 4, Fig. 5 being a section on the line 5—5 of Figs. 4, 6, and 7, and Figs. 6 and 7 being sections on the correspondingly numbered lines of Fig. 5.

Similar reference numerals are applied to corresponding parts throughout the views.

Figure 3:
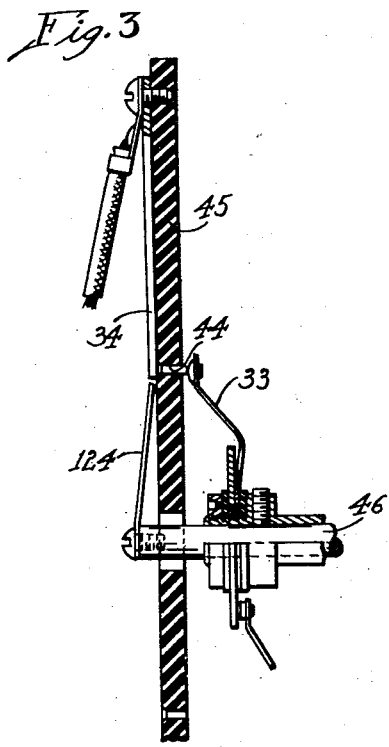
Fig. 3 is a section on the broken line 3—3 of Fig. 2.

Referring first to Figs. 1 to 3, the reference numeral 10 designates the tank of a base exchange water softener, and 11 the brine tank therefor. 12 is a rotary multiport valve, the rotor 13 of which is arranged to be turned from one operative position to another by a motor 14 having a worm and gear connection 15—16 with the stem 17 of the valve. The hard water to be softened is delivered through the pipe 18 to the body of the valve 12, and the flowing water operates a rotor in the flow actuated device 19, in this particular case a water meter. During normal softening operation with the rotor 13 of the valve 12 in the "service" position, assuming that the softener 10 is of a downflow type (although the invention is equally applicable to the upflow type of softener), the hard water is delivered from the valve 12 into the top of the tank 10 through the pipe 20 for passage downwardly through the bed 21 of water softening material, and softened water is therefore discharged from the bottom of the tank through the pipe 22 and is conducted back to the valve 12 and is therein directed to the service system through the pipe 23. At the end of the service run, after a predetermined amount of water has passed through the softener, the meter 19, as will later appear, automatically completes an electric circuit through the motor 14 to shift the rotor 13 of the valve 12 from the service position through approximately 90° to the backwash position. During the backwash, hard water from the pipe 18 is conducted through pipe 22 into the bottom of the tank 10 for passage upwardly through the bed 21 and out through the pipe 20 back to the valve 12 and thence to the sewer or other waste receptacle through the drain pipe 24. In this operation, sediment that collected on top of the bed during the softening operation is flushed out and the bed 21, which during the softening operation became more or less packed down, is loosened and broken up preparatory to the passage of brine through the bed to regenerate the same. The amount of water used for backwashing is measured by the meter 19 in the same way as the water flowing through the softener during the softening operation, and when a predetermined amount of water has been passed through the bed during the backwash operation, the meter 19 automatically completes an electric circuit through the motor 14 to cause it to shift the rotor 13 of the valve 12 again through 90° to the brine or salt wash position. During the salt wash, the hard water from the pipe 18 enters the valve 12 and flows through an ejector in the valve, whereby to entrain brine from the brine tank 11 through the pipe 25 in a manner well known in this art. The water and brine mixture is conducted from the valve through the pipe 20 into the top of the tank 10 for passage downwardly through the bed 21 to regenerate the water softening material. Resulting calcium and magnesium chlorides together with excess brine leaving the bottom of the tank 10 through the pipe 22 are conducted back to the valve 12 and thence to the sewer or other waste receptacle through drain pipe 24. Here again the meter 19 measures the amount of hard water used during the salt wash and in that way determines the amount of brine used, it being well known that a predetermined amount of brine is sufficient to regenerate a given amount of zeolite or other base exchange water softening material, and, hence, it is a matter of good economy to discontinue the flow of brine as soon as the predetermined amount has been used. The meter 19 at the end of the salt wash automatically completes an electric circuit again through the motor 14 to shift the rotor 13 of the valve 12 through 90° from the brine or salt wash position to the rinse position. During the rinse operation, the hard water from the pipe 18 is conducted from the valve 12 through the pipe 20 into the top of the tank for passage downwardly through the bed 21 and out through pipe 22 back to the valve 12 and thence to the sewer through the drain pipe 24. It requires a predetermined amount of rinse water to flush out the excess brine and resulting chlorides, and here again the meter 19 measures the water used, it being well known that after the correct amount of rinse water has been passed through the bed the outgoing water is soft water, and it is, therefore, good economy to discontinue the flow of rinse water as soon as the predetermined amount of rinse water has been used. The meter 19, as will later appear, automatically completes an electric circuit through the motor 14 at the end of the rinse operation to shift the rotor 13 of the valve 12 through 90° from the rinse position back to the service position. It is only to simplify the description that we have referred to 90° movements of the rotor 13 of the valve 12. It will soon appear that the control device of the present invention is not limited to this or any other specific movements of the valve rotor. Furthermore, although we have described the invention as applied to an automatic base exchange water softener, wherein the rotor 13 of the valve 12 assumes four different positions in each cycle, it should be understood that the invention is not limited to this or any other specific number of valve positions, nor is the invention to be regarded as limited to water softeners, inasmuch as it is applicable to filters and chemical treatment feeders, and, in fact, any fluid treatment apparatus in which it is desired to control or govern the different phases of operation and effect the automatic operation of any valve means from one position to another.

The meter 19 drives a shaft 26 carrying a control disk 27. This disk will, of course, be turned whenever water flows through the meter, and the number of turns is proportionate to the amount of water passed through the meter. The disk 27 is circular and is mounted concentrically on the shaft 26, but has a number of rounded peripheral projections 28 over which a roller 29 on the pivoted switch blade 30 is adapted to roll freely so as to close the contacts 31 four times in each complete revolution of the disk, there being four projections 28 on the periphery of the disk, as shown. As will later appear, the closing of the contacts 31 causes the contact advancing unit 32 to be advanced so that eventually it reaches a point where the rotatable contact 33 engages terminal 34 to complete an electric circuit through the motor 14 to shift the rotor 13 of the valve 12 from one position to another. Of course, the number of projections 28 on the control disk 27 may be increased or decreased as desired to suit different applications. If there is a relatively large number of projections 28, it will take a relatively small amount of water flowing through the meter 19 to advance the contact advancing unit 32 to the end point where the rotating contact 33 engages the contact 34 to complete an electric circuit through the motor 14 to shift the rotor 13 of the valve 12 from the service position, for example, to the backwash position. On the other hand, if a smaller number of projections 28 are provided on the periphery of the disk 27, it will require a proportionately greater amount of water flow through the meter 19 to advance the contact advancing unit to the end point where the contact 33 engages the contact 34 to complete an electric circuit through the motor 14 to shift the rotor 13 of the valve 12 from one position to another. Ordinarily the number of gallons passed through the softener during the softening operation is many times that used in the backwash, salt wash, and rinse. For example, a softener of conventional design having a capacity of say 13,250 gallons requires 248.5 gallons for the backwash, 215 gallons for the salt wash, and 426 gallons for rinse. Under the circumstances, whereas we have provided a solenoid 35 to operate an armature 36 to advance a ratchet wheel 37 step by step by direct impulses from the switch 30 during the backwash, salt wash, and rinse, we have provided an auxiliary or secondary solenoid 38 to operate a plunger 39 and oscillate a rocker 40 to advance a ratchet wheel 41 step by step for each impulse of the switch 30 during the service run, the ratchet wheel 41 being connected through a shaft 42 with a rotary switch 43 to complete a circuit through the solenoid 35 once for every ten energizations of the solenoid 38, there being ten teeth on the ratchet 41 and the ratchet being advanced one tooth upon each energization of the solenoid 38. If desired, we may, of course, provide the ratchet 41 with say twenty, or even thirty, teeth and by means of a suitable adjustable screw for limiting the oscillatory movement of the rocker 40 allow the ratchet 41 to be advanced one tooth, or two teeth, or three teeth, or more, upon each energization of the solenoid and thereby obtain different operating ratios between the solenoids 38 and 35, such as ten to one, twenty to one, thirty to one, and so forth. Usually, however, a ten to one ratio is sufficient for most applications, at least in the water softening field, especially in view of the fact that the contact 34 may be set in any one of fifty holes 44 in the control panel 45 to predetermine the total angularity of movement of the contact 33 from the start to the finish of the service run. The contact 33 is advanced step by step with the ratchet wheel 37, being connected with said wheel by a shaft 46. A pin 47 on the ratchet wheel 37 is arranged to move between abutments 48 and 49 on the back of the panel 45 in the turning of the ratchet wheel, and a spiral spring 50 has the inner end attached to the ratchet wheel and the outer end attached to the panel 45 and tends normally to return the ratchet wheel to the starting point with the pin 47 engaging the abutment 48. A pawl 51 pivoted at 52 on the back of the panel 45 has a tension spring 53 connected thereto serving to hold the pawl normally in engagement with the ratchet so as to allow step by step advancement but prevent return movement except when a solenoid 54 is energized at the end of the service run, the backwash, the salt wash, or the rinse. When that occurs the plunger 55 moves against the action of its return spring and oscillates the rocker 56 and releases the pawl 51 by means of the link connection 57 provided between one end of the pawl 51 and the adjacent end of the rocker 56. The rocker 56 is similar to the rocker 40 and has a pawl thereon engaging a ratchet wheel 58 fixed on a shaft 59 for turning a rotary switch 60 relative to a plurality of contacts disposed in circumferentially spaced relation relative to the switch. Contact 34, previously mentioned as determining by its setting the duration of the service run, is connected with one of this series of contacts numbered 61 by the conductor 62. The contact 63, which determines by its setting the duration of the backwash, is connected through conductors 64 with contact 65. Contact 66, which determines by its setting the duration of the rinse, is connected through conductor 67 with contact 68. Contact 69, which determines by its setting the duration of the salt wash, is connected through conductor 70 with contact 71.

There are four electric lights, 72, 73, 74, and 75, which are arranged to be lighted separately, the light 72 being, for example, green to indicate that the softener is on service run, the light 73 being, for example, red to indicate that the softener is on backwash, the light 74 being, for example, brown to indicate that the softener is on brine or salt wash, and the light 75 being, for example, white to indicate that the softener is on rinse. The contacts 34, 63, 66, and 69 are preferably colored to match the lights 72, 73, 74, and 75, respectively. Of course, if desired, there may be windows bearing the captions service, backwash, salt wash, and rinse, and these windows may be illuminated separately to indicate the different phases of operation, instead of employing different colored lights. Contact 76 is among those in circumferentially spaced relation around the rotary switch 60 and is connected by conductor 77 with the light 72. Contact 78 is the next contact and is connected by conductor 79 with the light 73. Contact 80 is the next contact and is connected by conductor 81 with the light 74, and contact 82 is the next contact and is connected by conductor 83 with the light 75. There is a set of three contacts 84 also included in the group of circumferentially spaced contacts around the switch 60, and these are interconnected with the conductor 85 which extends to one end of the coil of the solenoid 35 and to one contact of the spring blade type switch 86, that is normally opened but arranged to be closed by the rocker 40 in each energization of the solenoid 38, whereby once in each ten energizations of the solenoid 38 to energize the solenoid 35, namely, when the rotary switch 43 is closed. The last of the contacts in circumferentially spaced relation around the switch 60 is contact 87 that is connected by conductor 88 with the other contact of the switch 86 and with one end of the coil of the solenoid 38. The other end of the coil of the solenoid 38 is connected by conductor 89 with the other end of the coil of the solenoid 35 and with one of the contacts of a normally closed spring blade switch 90 that is arranged to be opened by the rocker 56 when the solenoid 54 is energized. A contact 91 has continuous engagement with the switch 60 and is connected by conductors 92 and 93 with one side of the source of electric current supply and also, as indicated at 94, with the electric motor 14. The other side of the source of electric current supply is connected on the one hand, as indicated at 95, with the contacts 76, 78, 80, and 82, and is connected on the other hand, as indicated at 96, with contacts 97, 98, 99, and 100 disposed in equally circumferentially spaced relation around the rotary switch 101. The switch 101 is connected to the stem 17 of the valve 12 for rotation and has a single notch 102 in the periphery thereof which serves to break the circuit for the motor 14 when the notch arrives at the "live" contact, whichever one of the group 97—100 that may be. Thus in Fig. 1a the contact 97 was the "live" contact at the end of the regeneration cycle when the circuit through the motor 14 was completed at the end of the rinse to shift the rotor 13 of the valve 12 from the rinse position to service position, the apparatus being illustrated in service position. A contact 103 has continuous engagement with the switch 101 and is connected by the conductor 104 with the coil of the solenoid 105 of a relay switch 106. The other end of the coil of the solenoid 105 is connected, as indicated at 107, with the conductor 95 and is also connected, as indicated at 108, with one of the contacts of the relay switch 106, the other contact being connected, as indicated at 109, with the other terminal of the motor 14, whereby to connect the motor 14 with the source of electric current supply whenever the relay switch 106 is closed by energization of the solenoid 105. The thing that determines which of the contacts 97—100 is "live" is the position of the rotary switch 60. It will be seen that the switch 60 has three lugs, a, b, and c, in equally circumferentially spaced relation. These lugs are arranged to engage the contacts disposed in circumferentially spaced relation around the switch 60 in a predetermined order. Thus, during the service run, lug a engages contact 76 to furnish current to the light 72 as a signal indicating that the softener is in service, and is also connected with contact 97 to maintain the circuit for the motor 14 in its operation in shifting the rotor 13 of the valve 12 from the rinse to the service position. Lug b engages contact 61 so as to make the contact 34 "live," whereby at the end of the service run when the contact 33 arrives at the contact 34, the motor 14 will be thrown into operation to shift the rotor 13 of the valve 12 from service position to backwash position. Lug c is shown engaging contact 87 whereby to furnish current to the solenoid 38 and switch 43 for energization of the solenoid 38 every time the switch 30 is closed and also energize the solenoid 35 once for every ten energizations of the solenoid 38, namely, when the switch 43 is closed.

There are twelve contacts evenly spaced around the switch 60 and there are twelve evenly spaced teeth in the ratchet 58. Consequently upon each energization of the solenoid 54 the switch 60 will be indexed one step through 30°. The solenoid 54 may be energized in either of two ways. The usual way is by engagement of the contact 33 with whichever one of the contacts 34, 63, 66, and 69 is "live." Thus, for example, since the contact 34 is "live" during the service run, the following circuit is completed at the end of the service run when the contact 33 engages contact 34: From one side of the source of current supply through conductor 93 and 92 to the switch 60, thence through conductor 62 to "live" contact 34, thence through contact 33 and sustaining contact 110 and conductors 111 and 112 through solenoid 54, thence through conductor 113 and emergency manual switch 114 and through one branch of the relay switch 116, and thence through conductor 117 through the switch 30 to the other side of the source of current supply. The other way in which the solenoid 54 may be energized is by manual operation of the emergency switch 114. This switch has its operating lever projecting from the front of the control panel 45, as indicated in Fig. 2, and the purpose of having this switch is to enable the operator to throw the softener into regeneration at will, if, for example, the water discharged from the softener does not test soft even though the softener has not completed its service run, such an eventuality being possible, for example, if at the time of regeneration there was insufficient brine in the brine tank 11 to properly take care of regeneration of the bed 21. The circuit completed when the switch 114 is operated is as follows: From one side of the source of electric current supply through conductors 93 and 118 through the lower set of contacts of switch 114, thence through conductor 112, solenoid 54, and conductor 113, through the second set of contacts of switch 114, and through conductors 119 and 95 to the other side of the source of current supply. The switch 114, in other words, makes a short circuit connection for energization of the solenoid 54 independently of whatever contact of the group 34, 63, 66, and 69 is "live." An emergency contact 120 is provided at the far end of the series of holes 44 on the control panel 45 so that if, due to wear or any other cause, the contact 33 does not complete a circuit through the solenoid 54 when it reaches the "live" contact, the circuit will be completed when the contact engages the contact 120, and the valve 12 will be operated by the motor 14 to the next position. Here again the advantage of having the emergency switch 114 is obvious; if at the end of the service run when the contact 33 engaged the contact 34 but failed to complete a circuit through the solenoid 54, for any reason, it is obvious that the water leaving the softener would soon thereafter test hard, because of the fact that the capacity of the softener was exceeded, and, of course, in such an event the operator noticing the hardness of the water could rectify the failure of the automatic mechanism by operating the switch 114 to throw the softener immediately into regeneration.

We have indicated above that the make and break switch 30 is relied upon not only for the energizations of solenoid 35 and 38 but also for energization of the solenoid 54. If the water flow happens to be discontinued at a point where the meter 19 has turned the disc 27 to a position holding the switch 30 closed, there would be danger of burning out the coil of solenoid 35 or 38, as the case might be, if it were not for the thermal cut-out 121, which, under such circumstances, automatically completes a circuit through the solenoid 122 of the relay switch 116 to break the circuit through solenoids 35 and 38, thus preventing damage thereto so long as the switch 30 may be held closed. The cut-out 121 depends for its continued holding of the switch 116 in retracted position upon the switch 30 remaining closed. As soon as the switch 30 opens, at the time of a further flow of water through the meter, the switch 116 returns to the normal position shown and normal operation is resumed.

When the solenoid 54 is energized the rocker 56, as previously stated, releases the pawl 51 to allow the contact 33 to return to the starting position. Therefore, the circuit mentioned above, which depended upon continued engagement of the contact 33 with the contact 34, would be interrupted were it not for the fact that the rocker 56, which up to the time of energization of the solenoid 54 held the spring blade switch 123 open, permits said switch to close simultaneously with the release of the pawl 51, to maintain the circuit through the solenoid as follows: From one side of the line through conductor 93 through switch 123 to conductor 112 and through solenoid 54 and conductor 113 through switches 114 and 116 and conductor 117 and switch 30 to conductor 95 to the other side of the line. As the rocker 56 approaches the limit of its forward movement, it opens the spring blade switch 90 which forms a part of the circuit through the solenoids 35 and 38, so that there will be no danger of the armature 36 interfering with the free and complete return of the ratchet wheel 37 when the pawl 51 is released.

In operation, when the switch 60 is turned from one position to another, as, for example, from the service position to the backwash position, the lugs a, b, and c complete new circuits, lug a having shifted into engagement with contact 78, lug b having shifted into engagement with contact 65, and lug c having shifted into engagement with the first of the set of contacts 84. Because of this, the new "live" contact for engagement by the contact 3 is red contact 63, which, it will be noticed, is set in a hole 44 fairly close to the starting position so that only a comparatively small amount of water will be permitted to flow through the softener during the backwash operation as compared with what passed through during the service run. During backwash, the contact 33 is advanced step by step upon each energization of the solenoid 35, and it is important to note that these energizations depend upon the closing of the switch 39 directly, as distinguished from the energizations of the solenoid 35 once for each ten energizations of the solenoid 38 during the service run, during which the switch 30 energizes the solenoid 38 directly and the solenoid 35 only indirectly. The engagement of lug a with contact 78 causes the lighting of the red backwash light 73, the circuit being from one side of the line through conductors 93 and 92 and switch 60 and conductor 79 and light 73 to conductor 95, and thence to the other side of the line. Coincidentally, current flows from conductor 79 through the conductor 96 to contact 98, and thence through switch 101 and contact 103 and conductor 104, solenoid 105 and conductors 107 and 95 to the other side of the line, whereby switch 106 is closed so as to connect the motor across the line. The motor 14 will therefore shift the rotor 13 of the valve 12 from the service position to the backwash position. The motor is certain of completing this operation, because the circuit through the solenoid 105 is not interrupted until the notch 102 in the switch 101 arrives at the contact 98. The softener remains on backwash until the contact 33 engages the contact 63, whereupon the solenoid 54 is energized similarly as at the end of the service run and switch 60 is indexed to the next position for the salt wash, the contact 33 being permitted, of course, to return to its starting position when the pawl 51 is released coincident with the indexing of the switch 60.

In the salt wash position, the switch 60 has its lug a engaging contact 80, its lug b engaging contact 71, and its lug c engaging the middle one of the set of three contacts 84. By reason of the engagement of lub b with contact 71, brown contact 69 becomes the "live" contact, and its setting in relation to the starting position of the contact 33 will be noted in Fig. 2 is much farther away from the starting position of the contact than the contact 63 which determines the duration of the backwash, the reason being that it requires much more flow through the softener to conduct the required amount of brine through the bed for complete regeneration thereof. The lug a engaging contact 80 completes a circuit through the brown salt wash light 74 and makes the contact 99 "live" so that a circuit through the motor 14 is completed by reason of energization of the solenoid 105 and the motor shifts the rotor 13 of the valve 12 from the backwash position to the salt wash position, the arrival of the notch 102 at the contact 99 breaking the circuit through the solenoid 105 and accordingly stopping the motor. During the salt wash, as during the backwash, the contact 33 is indexed one step for each energization of the solenoid 35, and, of course, the energizations of the solenoid 35 are dependent directly upon the closing of the switch 30, the same as during backwash. The salt wash continues until the contact 33 comes into engagement with the contact 69, whereupon the solenoid 54 is energized similarly as at the end of the service run to release the pawl 51 and index the switch 60 to the next position for the rinse.

In the rinse, the switch 60 has its lug a in engagement with contact 82, its lug b in engagement with contact 68, and its lug c in engagement with the last of the set of three contacts 84. The engagement of lug b with contact 68 makes white contact 66 "live," and it will be noticed in Fig. 2 that this contact is set not quite as far from the starting position of the contact 33 as the contact 69 which determined the duration of the salt wash, inasmuch as less flow is required to rinse out the excess brine and resulting calcium and magnesium chlorides from the bed 21. The engagement of lug a with contact 92 completes a circuit through the white rinse light 75 and makes the contact 100 "live" so that the motor 14 is thrown into operation to shift the rotor 13 of the valve 12 from the salt wash position to the rinse position, the motor 14 being stopped when the notch 102 arrives at the contact 100. When the contact 33 engages contact 66 at the end of the rinse operation, the solenoid 54 is energized similarly as at the end of the other phases described; and the softener is put back into service. The green contact 34 again becomes the "live" contact. The green service light 72 is lighted; and the rotor 13 of the valve 12 is turned until the notch 102 arrives at the contact 97, where it is illustrated in Fig. 1a. A pointer 124 is preferably provided on the end of the shaft 46 in front of the control panel 45, merely as an indication of how far advanced a particular phase is. Thus, for example, when the softener is on the service run and the pointer 124 has advanced to the fourth hole 44, as shown, whereas the green contact 34 toward which the pointer is being advanced is located in the twenty-fifth hole, it will be apparent to the operator that the softener has completed only about one-sixth of its service run. The operator may upon noting that the indicator is close to its terminal point decide not to wait for the softener to be thrown automatically into regeneration, if it should suit his convenience better to have the regeneration occur immediately. In such event the operator will operate the switch 114 to commence regeneration immediately.

The operation of the device of Figs. 1 to 3 is believed to be clear from the foregoing description. The device is practically fool-proof and is substantially universally adaptable to the requirements of different applications. The operator may, for example, reset the contacts 34, 63, 66, and 69 if for any reason it is considered desirable or economical to decrease or increase the gallonage during any one or more of the phases of operation. To illustrate this point, if the operator finds that at the point when the softener is automatically thrown into regeneration the outgoing water is still soft, he may increase the service run and more closely approach the maximum capacity of the softener and accordingly economize in the cost of softening. Principally, however, the wide range of adjustability of the present mechanism is of advantage in enabling use of the same mechanism for softeners having a corresponding wide range of capacities and requiring different gallonages for the backwash, the salt wash, and the rinse. Because of the fact that the specific construction of the valve 12 is not important in so far as the present invention is concerned, we have arbitrarily specified 90° movements of the rotor 13 between the four different positions, but, of course, it should be clear from the foregoing description that the valve positions may be spaced apart various angles, inasmuch as the positions are determined by the spacing of the contacts 97, 98, 99, and 100. A multiport rotary valve well adapted for the present purpose is disclosed in the copending application of Andrew Kromhout, Serial No. 464,744, filed November 6, 1942, (which resulted in Patent No. 2,388,268, issued November 6, 1945), in which the rotor comprises a plurality of valve shoes slidable over ports in the peripheral wall of the body or shell of the valve. The rotor moves through 180° from service position to the backwash position, and then moves through approximately 30° from the backwash position to the salt wash position, and through another approximately 30° from the salt wash position to the rinse position, and then through approximately 120° from the rinse position back to the service position. Manifestly the contacts 97, 98, 99, and 100 could be spaced accordingly, so as to adapt the Kromhout valve to use with the present mechanism.

Where the present control device is used in connection with a filter, a rotary valve of the kind disclosed in McGill Patent 2,209,994 may be used, the same having three positions. The valve position disk 101 in such event will have three contacts for the three positions angularly spaced in accordance with the movements of the valve rotor, and each phase of the operation would, of course, be controlled or governed similarly as in the operation of the softener described.

Referring now to Figs. 4 to 7, the mechanism herein illustrated closely resembles that of Figs. 1 to 3 and corresponding parts have been numbered accordingly. The principal difference in this mechanism lies in the fact that the meter operated shaft 26 is mechanically connected directly with a contact advancing unit 32' instead of operating a contact advancing unit 32 by electrical impulses from a remote point. Direct mechanical operation may be found to be more desirable under certain conditions. For one thing, it simplifies the electrical circuit considerably, as should be apparent from a comparison of Figs. 1 and 4, and, assuming that the mechanically operated advancing unit 32' is available at about the same cost as the electrically operated advancing unit 32, an appreciable saving in overall cost should be realized. The principal advantage, however, in the use of the electrical advancing unit 32 lies in the fact that the control panel 45 may be located any desired distance away from the meter 19. Another advantage, as will more clearly appear hereinafter, lies in the greater extent of adjustability of the electrical unit as compared with the mechanical one, bearing in mind what was pointed out above with reference to the feasibility of varying the stroke of the plunger 39 so as to obtain at will ratios of ten to one, twenty to one, or thirty to one, and so forth, between the service run gallons and the backwash, salt wash, or rinse gallons in determining the duration of these different phases.

The shaft 26 has a bevel gear 125 on the outer end thereof meshing with a bevel gear 126 carrying a crank pin 127 on which is pivotally attached one end of a pawl 128. This pawl has a wide tooth 129 for engagement with two sets of ratchet teeth 130 and 131 in two ratchet wheels 132 and 37'. The wheel 37' corresponds to the wheel 37 of Fig. 1 and is connected to a shaft 46' for step by step advancement of the contact 33, similarly as the wheel 37 in Fig. 1. It also has a spiral spring 50 to return it to the starting position, and has a stop pin 47 arranged to move between limiting abutments 48 and 49, similarly as in the construction of Fig. 1, so that when the pawl 51 cooperating with the ratchet wheel 37' is released, the wheel will return to the starting position with the pin 47 engaging the abutment 48 and with the contact 33 ready to commence step by step advancement through the next phase of operation. The pawls 51 and 128 are released together by a single link connection 133 with the rocker 56 operated by the plunger 55 of the solenoid 54. The pawl 51 is normally held engaged with the ratchet wheel 37' by means of the spring 53, and the pawl 128 is normally held engaged with both ratchet wheels 37' and 132 by means of the spring 134. A circular plate 135 has a center hole 136 providing a bearing for one end of the shaft 46', and the plate also provides a peripheral bearing 137 for rotatably supporting the ratchet wheel 132 in concentric relation with the ratchet wheel 37'. The plate 135 is fixed to one of two frame plates 138 which are disposed in fixed parallel spaced relation to one another and to the control panel 45'. A single pinion 139 provides an operating connection between the two ratchet wheels 37' and 132 and has continuous meshing engagement with the internal gear teeth 140 on the inside of the ratchet wheel 37' and intermittent meshing engagement with circumferentially spaced teeth 141 provided on the inside of the ratchet wheel 132. The pinion 139 is carried on a spindle 142 projecting from the plate 135. Now, the ratchet teeth 130 extend all of the way around the ratchet wheel 132, but the ratchet teeth 131 extend only part way around the ratchet wheel 37', whereby to provide a long smooth dwell portion 143. The toothed portion 131 of the wheel 37' is of sufficient angular extent to take care of the backwash, salt wash, and rinse operations, but not the service run. During the service run, when the pawl 128 has advanced the ratchet wheel 37' to a point where the pawl 128 engages the dwell portion 143, it is obvious that the pawl will no longer advance the wheel 37' step by step for each reciprocation of the pawl. From that point on, assuming there are four teeth 141 inside the ratchet wheel 132, as shown, the ratchet wheel 37' will thereafter be advanced the equivalent of only four teeth for each complete revolution of the ratchet wheel 132, the latter being, of course, continuously advanced tooth by tooth of its ratchet teeth 130 in the operation of the pawl 128 by the meter 19. In that way, any desired ratio may be obtained between the service run gallons and the backwash, salt wash, or rinse gallons. While we have disclosed four teeth 141, it is obvious that only one tooth might be provided, or two, or three, or more, depending upon the ratio desired.

It is believed that the operation of this form of our invention is clear from the description of the other form. In this form the leaf spring switch 90 can be omitted because of the fact that the solenoids 35 and 38 are eliminated and there is nothing that could possibly interfere with the free and complete return of the ratchet wheel 37'. The contacts 84 and 87 identified with solenoids 35 and 38 required in the other form are unnecessary in this form, and accordingly the switch 60 requires only two lugs $a$ and $b$.

It should be evident that the above described control device could also be used in conjunction with an apparatus for testing the hardness of water, such as, for instance, the apparatus disclosed in Patent No. 2,241,121 to Lee G. Daniels. Of course, in that event the regeneration cycle would be initiated by the hardness tester and not by a device for volumetric control as described above. The volumetric control, however, would be retained for all the phases of regeneration except the initiation of the regeneration cycle. Also, instead of an electric motor 14 for operating the valve a hydraulic motor could be used, the impulses from the control system being utilized for energizing the operating valves of said hydraulic motor, as, for instance, by means of solenoids. Of course, the invention is not limited to use with a multiport valve but is equally applicable to plants having a number of individually operated valves, and also to apparatus other than valves, such as pumps, ejectors, and the like.

It is believed the foregoing description conveys a good understanding of the objects and advantages of our invention. The appended claims have been drawn to cover all legitimate modifications and adaptations.

We claim:

1. A mechanical-electrical control system for a base exchange water softener, comprising in combination with a softener operatively connected with a source of raw water and to a service system and having also a drain connection and operative connection to a source of brine for regeneration of water softening material in the softener, a source of electric current supply, an electric motor electrically connected with said source of current supply, valve means having an operating shaft turnable by the motor to establish different water circuits for the softener in backwashing, salt washing, and rinsing, and for softening in different positions of rotation of the shaft, circuit-breaking switch means comprising a plurality of first contact elements electrically connected with said current supply and motor, and a first rotary member operatively connected to the valve operating shaft to contact said elements in different positions of the valve means, starting switch means for the motor comprising a plurality of second contact elements and a second rotary member, electric circuits including said first contact elements with some of said second contact elements and said motor, timing switch means comprising a plurality of angularly spaced third contact elements and a rotary contact movable toward engagement with said third contact elements from a starting position in intermittent step-by-step movements, to predetermine the duration of softening, backwashing, salt washing, and rinsing, means for returning said rotary contact to the starting position, a ratchet wheel connected with the rotary contact for turning it step-by-step in the forward direction, a holding pawl therefor and an advancing pawl, an electromagnetic device operatively connected with the holding pawl for releasing the same and operatively connected with the rotary member of said starting switch to index the same one step for each release of the holding pawl, electric circuits including said third contact elements and others of the second contact elements and said electromagnetic device, a meter for measuring the flow of water passing through the softener, and means operatively connecting said meter with said advancing pawl intermittently to turn the rachet wheel step-by-step in a forward direction in proportion to the amount of water passed through the softener.

2. A control system as set forth in claim 1, wherein the last mentioned means includes a relatively high ratio means and a relatively low ratio means, the high ratio means being operative during backwashing, salt washing, and rinsing to operate the advancing pawl intermittently in direct proportion to the amount of water passed through the softener, and the low ratio means being operative during softening to operate the advancing pawl intermittently in fractional proportion to the amount of water passed through the softener.

3. A control system as set forth in claim 1, wherein the last mentioned means comprises an electromagnetic device arranged to operate the advancing pawl upon each energization of said device, a make and break switch electrically connected with the current source and with the electromagnetic device for energization thereof, and means operated by the meter for operating said make and break switch intermittently in the operation of the meter.

4. A control system as set forth in claim 1, wherein the last mentioned means comprises an electromagnetic device arranged to operate the advancing pawl upon each energization of said device, a make and break switch electrically connected with the current source, means operated by the meter for operating said make and break switch intermittently in the operation of the meter, and electric circuits including said make and break switch and said electromagnetic device so as to energize the latter once for each operation of the make and break switch during backwashing, salt washing, and rinsing and once for each of a plurality of operations of the make and break switch during softening.

5. A mechanical-electrical control system for a fluid treatment apparatus, comprising in combination with a fluid treatment apparatus connected with a fluid source and a service system, a source of electric current supply, an electric motor electrically connected with said source of current supply, valve means having an operating shaft turnable by the motor to establish different fluid circuits for the apparatus in different positions of rotation of the shaft, circuit-breaking switch means comprising a plurality of first contact elements electrically connected with said current supply and motor, and a first rotary member operatively connected to the valve operating shaft to contact said elements in different positions of the valve means, starting switch means for the motor comprising a plurality of second contact elements and a second rotary member, electric circuits including said first contact elements with some of said second contact elements and said motor, timing switch means comprising a plurality of angularly spaced third contact elements and a rotary contact movable toward engagement with said third contact elements from a starting position in intermittent step-by-step movements to predetermine the duration of different phases of operation of said apparatus, means for returning said rotary contact to the starting position, a ratchet wheel connected with the rotary contact for turning it step-by-step in the forward direction, a holding pawl therefor and an advancing pawl, an electromagnetic device operatively connected with the holding pawl for releasing the same and operatively connected with the rotary member of said starting switch to index the same one step for each release of the holding pawl, electric circuits including said third contact elements and others of the second contact elements and said electromagnetic device, a meter for measuring the flow of fluid passing through the apparatus, and means operatively connecting said meter with said advancing pawl intermittently to turn the ratchet wheel step-by-step in a forward direction in proportion to the amount of fluid passed through the apparatus.

6. A control system as set forth in claim 5, wherein the last mentioned means includes a relatively high ratio means and a relatively low ratio means, the high ratio means being operative during one of the phases of operation of said apparatus to operate the advancing pawl intermittently in direct proportion to the amount of fluid passed through the apparatus, and the low ratio means being operative during another phase of operation of said apparatus to operate the advancing pawl intermittently in fractional proportion to the amount of fluid passed through the apparatus.

7. A control system as set forth in claim 5, wherein the last mentioned means comprises an electromagnetic device arranged to operate the advancing pawl upon each energization of said device, a make and break switch electrically connected with the current source and with the electromagnetic device for energization thereof, and means operated by the meter for operating said make and break switch intermittently in the operation of the meter.

8. A control system as set forth in claim 5, wherein the last mentioned means comprises an electromagnetic device arranged to operate the advancing pawl upon each energization of said device, a make and break switch electrically connected with the current source, means operated by the meter for operating said make and break switch intermittently in the operation of the meter, and electric circuits including said make and break switch and said electromagnetic device so as to energize the latter once for each operation of the make and break switch during one phase of the operation of the apparatus and once for each of a plurality of operations of the make and break switch during another phase of operation of the apparatus.

9. In a water softening apparatus, a tank containing a softening material, a tank containing material for regenerating the softening material, a system of piping therefor including pipes for introducing hard water into the first tank and withdrawing softened water therefrom, and a pipe connection between said tanks for conducting regenerating brine from the second tank to the softening material in the first tank, valve means controlling the flow through said piping, an electric motor for operating the valve means step-by-step through a cycle, means for stopping the motor so as to predetermine the different positions of said valve means in the cycle, an electrical timer device controlling the starting of said motor to determine the duration of each stage of the cycle, said timer device comprising a movable contactor having a plurality of contacts to be engaged thereby to complete an electrical circuit through said motor, each of said contacts being individually identified with a stage of the cycle and all being individually adjustable relative to the contactor to predetermine independently the duration of each stage of the cycle, means controlled by said timer device for starting the motor to operate said valve means at the end of each stage of the cycle, and a meter measuring the flow of water through the softening material and operatively connected for slowly advancing said contactor in all stages of the cycle.

10. In a water softening apparatus, a tank containing a softening material, a tank containing material for regenerating the softening material, a system of piping therefor including pipes for introducing hard water into the first tank and withdrawing softened water therefrom, and a pipe connection between said tanks for conducting regenerating brine from the second tank to the softening material in the first tank, valve means controlling the flow through said piping, an electric motor for operating the valve means step-by-step through a cycle, means for stopping the motor so as to predetermine the different positions of said valve means in the cycle, an electrical timer device controlling said motor to determine the duration of each stage of the cycle, comprising a rotary contactor, ratchet means for moving said contactor step by step from a starting position, spring means for returning said contactor to the starting position at the commencement of each stage of the cycle, and a plurality of angularly spaced contacts identified with the different stages of the cycle and adjustable to different angularities with respect to the starting position of the rotary contactor to predetermine the duration of the different stages of the cycle, means operable when the rotary contactor reaches one of said contacts at the end of each stage of the cycle to start said motor, a meter measuring the flow of water through the softening material during all stages of the cycle, and means operatively connecting said meter with the ratchet means to intermittently advance the contactor from the starting position during each stage of the cycle in proportion to the amount of water passing through the softening material.

11. In a water softening apparatus, a tank containing a softening material, a tank containing material for regenerating the softening material, a system of piping therefor including pipes for introducing hard water into the first tank and withdrawing softened water therefrom, and a pipe connection between said tanks for conducting regenerating brine from the second tank to the softening material in the first tank, valve means controlling the flow through said piping, an electric motor for operating the valve means step-by-step through a cycle, means for stopping the motor so as to predetermine the different positions of said valve means in the cycle, an electrical timer device controlling said motor to determine the duration of each stage of the cycle, comprising a rotary contactor, ratchet means for moving said contactor step by step from a starting position, spring means for returning said contactor to the starting position at the commencement of each stage of the cycle, and a plurality of angularly spaced contacts identified with the different stages of the cycle and adjustable to different angularities with respect to the starting position of the rotary contactor to predetermine the duration of the different stages of the cycle, means operable when the rotary contactor reaches one of said contacts at the end of each stage of the cycle to start said motor, a meter for measuring the flow of water through the softening material during all stages of the cycle, a relatively high ratio means operatively connecting the meter with the ratchet means during all but the softening stage of the cycle to intermittently advance the rotary contactor in direct proportion to the flow of water through the softening material, and a relatively low ratio means operatively connecting the meter with said ratchet means during the softening stage of the cycle to intermittently advance the rotary contactor in fractional proportion to the flow of water through the softening material.

12. In water softening apparatus, the combination with a softener tank, a brine tank, and conduits for passing water through said softener tank and for delivering brine from the brine tank into said softener tank, control valve means in said conduits, a shaft for turning the control valve means, a motor operatively connected to the shaft for turning the same, a rotary switch operatively connected to the shaft and connected in an electrical circuit with the motor to stop the motor when the shaft has been turned through a predetermined angle, another rotary switch electrically connected in circuit with the first switch arranged to be turned at timed intervals through a cycle to complete a circuit through the motor to start the same, means for turning the second rotary switch, an electrical timer device predetermining the times of operation of the last named means in relation to gallonage of flow of water or brine through the softener to determine the duration of each stage of the cycle, and a meter measuring the flow of water and brine through the softener tank operating said timer in all stages of the cycle.

13. In a mechanism of the character described, the combination with a device through which fluid from a source of fluid supply is passed differently in different stages of a cycle accordingly as its associated valve mechanism is operated to different positions for the different stages of the cycle, and valve mechanism to be operated, of a meter arranged to operate as fluid is passed therethrough, an electric motor operatively connected with said valve mechanism for operating the same, a source of electric current supply, a stop switch electrically connected to said motor and source controlling the current for said motor and operated with the valve mechanism so as to stop said motor when the valve mechanism has been moved to predetermined positions in a cycle, a start switch electrically connected with the stop switch and source to initiate the operation of the motor at the end of each stage of the cycle, and a time switch electrically connected with the start switch and source and controlled by the meter in response to fluid flowing therethrough in all stages of the cycle to control the turning of the start switch and predetermine the duration of each stage of the cycle.

14. In a mechanism of the character described, the combination with a device through which fluid from a source of fluid supply is passed differently in different stages of a cycle accordingly as its associated valve mechanism is operated to different positions for the different stages of the cycle, and valve mechanism to be operated, of a meter arranged to operate as fluid is passed therethrough, an electric motor operatively connected with said valve mechanism for operating the same, a source of electric current supply, a stop switch electrically connected to said motor and source controlling the current for said motor and operated with the valve mechanism so as to stop said motor when the valve mechanism has been moved to predetermined positions in a cycle, a start switch electrically connected with the stop switch and source to initiate the operation of the motor at the end of each stage of the cycle, and a timing device settable in advance to predetermine its length of running for each of a plurality of stages in the cycle operatively connected on the one hand with the source and start switch to turn the latter step-by-step in one direction at the end of each stage of the cycle and operatively connected on the other hand with the meter for step-by-step movement from a starting point to the end of each run in proportion to the amount of fluid flowing through the meter.

15. An electro-volumetric control device of the class described comprising in combination with a device through which fluid flow occurs, and a mechanism shiftable to different operating positions for directing the flow differently in different phases of a cycle, of a motor, means connecting said motor to said mechanism for shifting the mechanism to different operating positions, a source of electric current supply, electrical means connected to said source for control of said motor including circuit making and breaking means causing starting and stopping of said motor, flow operated means for controlling the operation of said circuit making and breaking means, a contactor operable by said flow operated means, contact means engageable by said contactor and electrically connected with said source of current supply and said motor, said contact means comprising individual contacts individually adjustable with respect to each other and relative to the contactor for determination of the duration of the periods between actuation of said mechanism to be operated, means for returning said contactor to starting position upon each actuation of said mechanism to be operated, and means operable with the last mentioned means to operate the circuit making means so as to start the motor.

16. A mechanical-electrical control system for a base exchange water softener, comprising in combination with a softener operatively connected with a source of raw water and to a service system and having also a drain connection and operative connection to a source of brine for regeneration of water softening material in the softener, a source of electric current supply, an electric motor electrically connected with said source of current supply, valve means having an operating shaft turnable by the motor to establish different water circuits for the softener in backwashing, salt washing, and rinsing, and for softening in different positions of rotation of the shaft, circuit-breaking switch means comprising a plurality of first contact elements electrically connected with said current supply and motor, and a first rotary member operatively connected to the valve operating shaft to contact said elements in different positions of the valve means, starting switch means for the motor comprising a plurality of second contact elements and a secondary rotary member, electric circuits including said first contact elements with some of said second contact elements and said motor, timing switch means comprising a plurality of angularly spaced third contact elements and a rotary contact movable toward engagement with said third contact elements from a starting position in intermittent step-by-step movements, said third contact elements being individually adjustable to different angularities from the starting position of the rotary contact to predetermine the duration of softening, backwashing, salt washing, and rinsing, means for returning said rotary contact to the starting position, a ratchet wheel connected with the rotary contact for turning it step-by-step in the forward direction, a holding pawl therefor and an advancing pawl, an electromagnetic device operatively connected with the holding pawl for releasing the same and operatively connected with the rotary member of said starting switch means to index the same one step for each release of the holding pawl, electric circuits including said third contact elements and others of the second contact elements and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener.

17. A mechanical-electrical control system for a fluid treatment apparatus, comprising in combination with a fluid treatment apparatus connected with a fluid source and a service system, a source of electric current supply, an electric motor electrically connected with said source of current supply, valve means having an operating shaft turnable by the motor to establish different fluid circuits for the apparatus in different positions of rotation of the shaft, circuit-breaking switch means comprising a plurality of first contact elements electrically connected with said current supply and motor, and a first rotary member operatively connected to the valve operating shaft to contact said elements in different positions of the valve means, starting switch means for the motor comprising a plurality of second contact elements and a second rotary member, electric circuits including said first contact elements with some of said second contact elements and said motor, timing switch means comprising a plurality of angularly spaced third contact elements and a rotary contact movable toward engagement with said third contact elements from a starting position in intermittent step-by-step movements, said third contact elements being individually adjustable to different angularities from the starting position of the rotary contact to predetermine the duration of different phases of operation of said apparatus, means for returning said rotary contact to the starting position, a ratchet wheel connected with the rotary contact for turning it step-by-step in the forward direction, a holding pawl therefor and an advancing pawl, an electromagnetic device operatively connected with the holding pawl for releasing the same and operatively connected with the rotary member of said starting switch to index the same one step for each release of the holding pawl, electric circuits including said third contact elements and others of the second contact elements and said electromagnetic device, a meter for measuring the flow of fluid passing through the apparatus, and means operatively connecting said meter with said advancing pawl intermittently to turn the ratchet wheel step-by-step in a forward direction in proportion to the amount of fluid passed through the apparatus.

18. A control system of the character described, comprising, in combination, a base-exchange water softener operatively connected with a source of raw water and a service system, and having a drain connection and operative connection to a source of brine for regeneration of water softening material in the softener, a source of electric current supply, valve means to establish different circulation circuits for the softener in backwashing, salting, and rinsing and for softening, electrically operable means for operating said valve means connected with said current source, make and break electrical switch means for rendering said valve operating means operative and inoperative and including a first rotary contactor adapted to be indexed, timing switch means comprising a plurality of angularly spaced contact elements and a second rotary contactor movable toward engagement with said contact elements from a starting position in intermittent step-by-step movements to predetermine the duration of softening, backwashing, salting, and rinsing, means for returning said second rotary contactor to the starting position, a ratchet wheel connected with the second rotary contactor to turn it step-by-step in the forward direction, a holding pawl therefor and an advancing pawl, an electromagnetic device connected to said holding pawl to release the same and operatively connected with the first rotary contactor of said make and break switch means to index the same one step for each release of the holding pawl, electric circuits including said value operating means and current source and the aforesaid contact elements and said make and break switch means and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener.

19. A control system as set forth in claim 18, wherein the last mentioned means includes a relatively high ratio means and a relatively low ratio means, the high ratio means being operative during backwashing, salt washing, and rinsing to operate the advancing pawl intermittently in direct proportion to the amount of water passed through the softener, and the low ratio means being operative during softening to operate the advancing pawl intermittently in fractional proportion to the amount of water passed through the softener.

20. A control system as set forth in claim 18, wherein the last mentioned means comprises an electromagnetic device arranged to operate the advancing pawl upon each energization of said device, a make and break switch electrically connected with the current source and with the electromagnetic device for energization thereof, and means operated by the meter for operating said make and break switch intermittently in the operation of the meter.

21. A control system as set forth in claim 18, wherein the last mentioned means comprises an electromagnetic device arranged to operate the advancing pawl upon each energization of said device, a make and break switch electrically connected with the current source, means operated by the meter for operating said make and break switch intermittently in the operation of the meter, and electric circuits including said make and break switch and said electromagnetic device so as to energize the latter once for each operation of the make and break switch during backwashing, salt washing, and rinsing and once for each of a plurality of operations of the make and break switch during softening.

22. A control system of the character described, comprising, in combination, a base-exchange water softener operatively connected with a source of raw water and a service system, and having a drain connection and operative connection to a source of brine for regeneration of water softening material in the softener, a source of electric current supply, valve means to establish different circulation circuits for the softener in backwashing, salting, and rinsing and for softening, electrically operable means for operating said valve means connected with said current source, make and break electrical switch means for rendering said valve operating means operative and inoperative and including a first rotary contactor adapted to be indexed, timing switch means comprising a plurality of angularly spaced contact elements and a second rotary contactor movable toward engagement with said contact elements from a starting position in intermittent step-by-step movements to predetermine the duration of softening, backwashing, salting, and rinsing, means for returning said second rotary contactor to the starting position, a ratchet wheel connected with the second rotary contactor to turn it step-by-step in the forward direction, a holding pawl therefor and an advancing pawl, an electromagnetic device connected to said holding pawl to release the same and operatively connected with the first rotary contactor of said make and break switch means to index the same one step for each release of the holding pawl, electric circuits including said valve operating means and current source and the aforesaid contact elements and said make and break switch means and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener, the contact elements cooperating with said second rotary contactor being individually adjustable to different angularities to accordingly vary and predetermine the duration of softening, backwashing, salting and rinsing.

23. A control system of the character described, comprising, in combination, a base-exchange water softener operatively connected with a source of raw water and a service system, and having a drain connection and operative connection to a source of brine for regeneration of water softening material in the softener, a source of electric current supply, valve means to establish different circulation circuits for the softener in backwashing, salting, and rinsing and for softening, electrically operable means for operating said valve means connected with said current source, make and break electrical switch means for rendering said valve operating means operative and inoperative and including a first contactor adapted to be indexed, timing switch means comprising a plurality of contact elements spaced different distances from a starting point and a second contactor movable from the starting point toward these contact elements in intermittent step-by-step movements to predetermine the duration of softening, backwashing, salting and rinsing, means for returning said second contactor to the starting point, ratchet means connected with said second contactor to advance it step-by-step in the forward direction, a holding pawl and an advancing pawl for said ratchet means, an electromagnetic device connected to said holding pawl to release the same and operatively connected with the first contactor of said make and break switch means to index the same one step for each release of the holding pawl, electric circuits including said valve operating means and current source and the aforesaid contact elements and said make and break switch means and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener.

24. A control system as set forth in claim 23, wherein the last mentioned means includes a relatively high ratio means and a relatively low ratio means, the high ratio means being operative during backwashing, salt washing, and rinsing to operate the advancing pawl intermittently in direct proportion to the amount of water passed through the softener, and the low ratio means being operative during softening to operate the advancing pawl intermittently in fractional proportion to the amount of water passed through the softener.

25. A control system as set forth in claim 23, wherein the last mentioned means comprises an electromagnetic device arranged to operate the advancing pawl upon each energization of said device, a make and break switch electrically connected with the current source and with the electromagnetic device for energization thereof, and means operated by the meter for operating said make and break switch intermittently in the operation of the meter.

26. A control system as set forth in claim 23, wherein the last mentioned means comprises an electromagnetic device arranged to operate the advancing pawl upon each energization of said device, a make and break switch electrically connected with the current source, means operated by the meter for operating said make and break switch intermittently in the operation of the meter, and electric circuits including said make and break switch and said electromagnetic device so as to energize the latter once for each operation of the make and break switch during backwashing, salt washing, and rinsing and once for each of a plurality of operations of the make and break switch during softening.

27. A control system of the character described, comprising, in combination, a base-exchange water softener operatively connected with a source of raw water and a service system, and having a drain connection and operative connection to a source of brine for regeneration of water softening material in the softener, a source of electric current supply, valve means to establish different circulation circuits for the softener in backwashing, salting, and rinsing and for softening, electrically operable means for operating said valve means connected with said current source, make and break electrical switch means for rendering said valve operating means operative and inoperative and including a first contactor adapted to be indexed, timing switch means comprising a plurality of contact elements spaced different distances from a starting point and a second contactor movable from the starting point toward these contact elements in intermittent step-by-step movements to predetermine the duration of softening, backwashing, salting and rinsing, means for returning said second contactor to the starting point, ratchet means connected with said second contactor to advance it step-by-step in the forward direction, a holding pawl and an advancing pawl for said ratchet means, an electromagnetic device connected to said holding pawl to release the same and operatively connected with the first contactor of said make and break switch means to index the same one step for each release of the holding pawl, electric circuits including said valve operating means and current source and the aforesaid contact elements and said make and break switch means and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener, the contact elements cooperating with the second contactor being individually adjustable to different distances from the starting point to accordingly vary and predetermine the duration of softening, backwashing, salting, and rinsing.

28. A control system of the character described comprising, in combination with a fluid treatment apparatus connected with a fluid source and a service system, a source of electric current supply, valve means to establish different circulation circuits for said apparatus in different phases of its operation, electrically operable means for operating said valve means connected with said current source, make and break electrical switch means for rendering said valve operating means operative and inoperative and including a first rotary contactor adapted to be indexed, timing switch means comprising a plurality of angularly spaced contact elements, and a second rotary contactor movable toward engagement with said contact elements from a starting position in intermittent step-by-step movements to predetermine the duration of different phases of operation of said apparatus, means for returning said second rotary contactor to the starting position, a ratchet wheel connected with the second rotary contactor to turn it step-by-step in the forward direction, a holding pawl therefor and an advancing pawl, an electromagnetic device connected to said holding pawl to release the same and operatively connected with the first rotary contactor of said make and break switch means to index the same one step for each release of the holding pawl, electric circuits including valve operating means and current source and the aforesaid contact elements and said make and break switch means and said electromagnetic device, a meter for measuring the flow of fluid passing through the fluid treatment apparatus, and means operatively connecting said meter with said advancing pawl intermittently to turn the ratchet wheel step-by-step in a forward direction in proportion to the amount of fluid passed through the fluid treatment apparatus.

29. A control system of the character described comprising, in combination with a fluid treatment apparatus connected with a fluid source and a service system, a source of electric current supply, valve means to establish different circulation circuits for said apparatus in different phases of its operation, electrically operable means for operating said valve means connected with said current source, make and break electrical switch means for rendering said valve operating means operative and inoperative and including a first rotary contactor adapted to be indexed, timing switch means comprising a plurality of angularly spaced contact elements, and a second rotary contactor movable toward engagement with said contact elements from a starting position in intermittent step-by-step movements to predetermine the duration of different phases of operation of said apparatus, means for returning said second rotary contactor to the starting position, a ratchet wheel connected with the second rotary contactor to turn it step-by-step in the forward direction, a holding pawl therefor and an advancing pawl, an electromagnetic device connected to said holding pawl to release the same and operatively connected with the first rotary contactor of said make and break switch means to index the same one step for each release of the holding pawl, electric circuits including valve operating means and current source and the aforesaid contact elements and said make and break switch means and said electromagnetic device, a meter for measuring the flow of fluid passing through the fluid treatment apparatus, and means operatively connecting said meter with said advancing pawl intermittently to turn the ratchet wheel step-by-step in a forward direction in proportion to the amount of fluid passed through the fluid treatment apparatus, the contact elements cooperating with said second rotary contactor being individually adjustable to different angularities to accordingly vary and predetermine the duration of different phases of the operation of said fluid treatment apparatus.

30. A control system of the character described comprising, in combination with a fluid treatment apparatus connected with a fluid source and a service system, a source of electric current supply, valve means to establish different circulation circuits for said apparatus in different phases of its operation, electrically operable means for operating said valve means connected with said current source, make and break electrical switch means for rendering said valve operating means operative and inoperative and including a first contactor adapted to be indexed, timing switch means comprising a plurality of contact elements spaced different distances from a starting point, and a second contactor movable from the starting point toward these contact elements in intermittent step-by-step movements to predetermine the duration of different phases of the operation of said fluid treatment apparatus, means for returning said second contactor to the starting point, ratchet means connected with said second contactor to advance it step-by-step in the forward direction, a holding pawl and an advancing pawl for said ratchet means, an electromagnetic device connected to said holding pawl to release the same and operatively connected with the first contactor of said make and break switch means to index the same one step for each release of the holding pawl, electric circuits including valve operating means and current source and the aforesaid contact elements and said make and break switch means and said electromagnetic device, a meter for measuring the flow of fluid passing through the fluid treatment apparatus, and means operatively connecting said meter with said advancing pawl intermittently to turn the ratchet wheel step-by-step in a forward direction in proportion to the amount of fluid passed through the fluid treatment apparatus.

31. A control system of the character described comprising, in combination with a fluid treatment apparatus connected with a fluid source and a service system, a source of electric current supply, valve means to establish different circulation circuits for said apparatus in different phases of its operation, electrically operable means for operating said valve means connected with said current source, make and break electrical switch means for rendering said valve operating means operative and inoperative and including a first contactor adapted to be indexed, timing switch means comprising a plurality of contact elements spaced different distances from a starting point, and a second contactor movable from the starting point toward these contact elements in intermittent step-by-step movements to predetermine the duration of different phases of the operation of said fluid treatment apparatus, means for returning said second contactor to the starting point, ratchet means connected with said second contactor to advance it step-by-step in the forward direction, a holding pawl and an advancing pawl for said ratchet means, an electromagnetic device connected to said holding pawl to release the same and operatively connected with the first contactor of said make and break switch means to index the same one step for each release of the holding pawl, electric circuits including valve operating means and current source and the aforesaid contact elements and said make and break switch means and said electromagnetic device, a meter for measuring the flow of fluid passing through the fluid treatment apparatus, and means operatively connecting said meter with said advancing pawl intermittently to turn the ratchet wheel step-by-step in a forward direction in proportion to the amount of fluid passed through the fluid treatment apparatus, the contact elements cooperating with the second contactor being adjustable to different distances from the starting point to accordingly vary and predetermine the duration of different phases of the operation of said fluid treatment apparatus.

32. A control system as set forth in claim 30, wherein the last-mentioned means includes a relatively high ratio means and a relatively low ratio means, the high ratio means being operative during a certain phase or phases to operate the advancing pawl intermittently in direct proportion to the amount of fluid passed through the fluid treatment apparatus, and the low ratio means being operative during another phase or phases to operate the advancing pawl intermittently in fractional proportion to the amount of fluid passed through the fluid treatment apparatus.

33. A control system as set forth in claim 30, wherein the last-mentioned means comprises an electromagnetic device arranged to operate the advancing pawl upon each energization of said device, a make and break switch electrically connected with the current source and with the electromagnetic device for energization thereof, and means operated by the meter for operating said make and break switch intermittently in the operation of the meter.

34. A control system as set forth in claim 30, wherein the last-mentioned means comprises an electromagnetic device arranged to operate the advancing pawl upon each energization of said device, a make and break switch electrically connected with the current source, means operated by the meter for operating said make and break switch intermittently in the operation of the meter, and electric circuits including said make and break switch and said electromagnetic device so as to energize the latter once for each operation of the make and break switch during a certain phase or phases and once for each of a plurality of operations of the make and break switch during another phase or phases.

35. In a mechanism of the character described, the combination with a water treatment device through which water from a source of water supply is passed differently in different stages of a cycle accordingly as its associated valve mechanism is operated to different positions for the different stages of the cycle, and valve mechanism to be operated, of a meter arranged to operate as water is passed therethrough, an electric motor operatively connected with said valve mechanism for operating the same, a source of electric current supply, a stop switch electrically connected to said motor and source controlling the current for said motor and operated with the valve mechanism so as to stop said motor when the valve mechanism has been moved to predetermined positions in a cycle, a start switch electrically connected with the stop switch and source to initiate the operation of the motor at the end of each stage of the cycle, and a time switch electrically connected with the start switch and source and controlled by the meter in response to water flowing therethrough in all stages of the cycle to control the turning of the start switch and predetermine the duration of each stage of the cycle.

36. In a mechanism of the character described, the combination with a water treatment device through which water from a source of water supply is passed differently in different stages of a cycle accordingly as its associated valve mechanism is operated to different positions for the different stages of the cycle, and valve mechanism to be operated, of a meter arranged to operate as water is passed therethrough, an electric motor operatively connected with said valve mechanism for operating the same, a source of electric current supply, a stop switch electrically connected to said motor and source controlling the current for said motor and operated with the valve mechanism so as to stop said motor when the valve mechanism has been moved to predetermined positions in a cycle, a start switch electrically connected with the stop switch and source to initiate the operation of the motor at the end of each stage of the cycle, and a timing device settable in advance to predetermine its length of running for each of a plurality of stages in the cycle operatively connected on the one hand with the source and start switch to turn the latter step-by-step in one direction at the end of each stage of the cycle and operatively connected on the other hand with the meter for step-by-step movement from a starting point to the end of each run in proportion to the amount of water flowing through the meter.

37. In a mechanism of the character described, the combination with a device through which fluid from a source of fluid supply is passed differently in different stages of a cycle accordingly as its associated valve mechanism is operated to different positions for the different stages of the cycle, and valve mechanism to be operated, of a meter arranged to operate as fluid is passed therethrough, an electric motor operatively connected with said valve mechanism for operating the same, a source of electric current supply, a stop switch electrically connected to said motor and source controlling the current for said motor and operated with the valve mechanism so as to stop said motor when the valve mechanism has been moved to predetermined positions in a cycle, a start switch electrically connected with the stop switch and source to initiate the operation of the motor at the end of each stage of the cycle, a time switch electrically connected with the start switch and source and controlled by the meter in response to fluid flowing therethrough in all stages of the cycle to control the turning of the start switch and predetermine the duration of each stage of the cycle, and a manually operable control switch connected to short circuit the time switch and cause the turning of the starting switch at the will of the operator.

38. In a mechanism of the character described, the combination with a device through which fluid from a source of fluid supply is passed differently in different stages of a cycle accordingly as its associated valve mechanism is operated to different positions for the different stages of the cycle, and valve mechanism to be operated, of a meter arranged to operate as fluid is passed therethrough, an electric motor operatively connected with said valve mechanism for operating the same, a source of electric current supply, a stop switch electrically connected to said motor and source controlling the current for said motor and operated with the valve mechanism so as to stop said motor when the valve mechanism has been moved to predetermined positions in a cycle, a start switch electrically connected with the stop switch and source to initiate the operation of the motor at the end of each stage of the cycle, a timing device settable in advance to predetermine its length of running for each of a plurality of stages in the cycle operatively connected on the one hand with the source and start switch to turn the latter step-by-step in one direction at the end of each stage of the cycle and operatively connected on the other hand with the meter for step-by-step movement from a starting point to the end of each run in proportion to the amount of fluid flowing through the meter, and a manually operable control switch connected and arranged to be moved to a closed circuit position to cause the motor to be operated independently of the timing device.

39. A control system as set forth in claim 30, wherein the timing switch means includes an emergency contact element in spaced relation to one of the timing switch contact elements which is endmost in relation to the rest of the timing switch contact elements and in relation to the forward travel of the second contactor from a starting position, said emergency contact being included in the electrical circuits with the other timing switch contact elements and said electromagnetic device, said second contactor being adapted to engage the emergency contact to close a circuit through the electromagnetic device in the event that does not occur when the second contactor has engaged the others of the timing switch contact elements.

40. A control system of the character described comprising in combination, a base-exchange water softener operatively connected with a source of raw water and a service system, and having a drain connection and operative connection to a source of brine for regeneration of water softening material in the softener, a source of electric current supply, valve means to establish different circulation circuits for the softener in backwashing, salting, and rinsing, electrically operable means for operating said valve means connected with said current source, make and break electrical switch means for rendering said valve operating means operative and inoperative and including a first contactor adapted to be indexed, timing switch means comprising a plurality of contact elements spaced different distances from a starting point and a second contactor movable from the starting point toward these contact elements in intermittent step-by-step movements to predetermine the duration of backwashing, salting and rinsing, means for returning said second contactor to the starting point, ratchet means connected with said second contactor to advance it step-by-step in the forward direction, a holding pawl and an advancing pawl for said ratchet means, an electromagnetic device connected to said holding pawl to release the same and operatively connected with the first contactor of said make and break switch means to index the same one step for each release of the holding pawl, electric circuits including said valve operating means and current source and the aforesaid contact elements and said make and break switch means and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener.

41. A control system as set forth in claim 40, wherein the last mentioned means comprises an electromagnetic device arranged to operate the advancing pawl upon each energization of said device, a make and break switch electrically connected with the current source and with the electromagnetic device for energization thereof, and means operated by the meter for operating said make and break switch intermittently in the operation of the meter.

42. A mechanical-electrical control system for a base exchange water softener, comprising in combination with a softener operatively connected with a source of raw water and to a service system and having also a drain connection and operative connection to a source of brine for regeneration of water softening material in the softener, a source of electric current supply, an electric motor electrically connected with said source of current supply, valve means having an operating shaft turnable by the motor to establish different water circuits for the softener in backwashing, salt washing, and rinsing, in different positions of rotation of the shaft, circuit breaking switch means comprising a plurality of first contact elements electrically connected with said current supply and motor, and a first rotary member operatively connected to the valve operating shaft to contact said elements in different positions of the valve means, starting switch means for the motor comprising a plurality of second contact elements and a second rotary member, electric circuits including said first contact elements with some of said second contact elements and said motor, timing switch means comprising a plurality of angularly spaced third contact elements and a rotary contact movable toward engagement with said third contact elements from a starting position in intermittent step-by-step movements to predetermine the duration of backwashing, salt washing, and rinsing, means for returning said rotary contact to the starting position, a ratchet wheel connected with the rotary contact for turning it step-by-step in the forward direction, a holding pawl therefor and an advancing pawl, an electromagnetic device operatively connected with the holding pawl for releasing the same and operatively connected with the rotary member of said starting switch to index the same one step for each release of the holding pawl, electric circuits including said third contact elements and others of the second contact elements and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener.

43. A mechanical-electrical control system for a base exchange water softener, comprising in combination with a softener operatively connected with a source of raw water and to a service system and having also a drain connection and operative connection to a source of brine for regeneration of water softening material in the softener, a source of electric current supply, an electric motor electrically connected with said source of current supply, valve means having an operating shaft turnable by the motor to establish different water circuits for the softener in backwashing, salt washing, and rinsing, in different positions of rotation of the shaft, circuit-breaking switch means comprising a plurality of first contact elements electrically connected with said current supply and motor, and a first rotary member operatively connected to the valve operating shaft to contact said elements in different positions of the valve means, starting switch means for the motor comprising a plurality of second contact elements and a second rotary member, electric circuits including said first contact elements with some of said second contact elements and said motor, timing switch means comprising a plurality of angularly spaced third contact elements and a rotary contact movable toward engagement with said third contact elements from a starting position in intermittent step-by-step movements, said third contact elements being individually adjustable to different angularities from the starting position of the rotary contact to predetermine the duration of backwashing, salt washing, and rinsing, means for returning said rotary contact to the starting position, a ratchet wheel connected with the rotary contact for turning it step-by-step in the forward direction, a holding pawl therefor and an advancing pawl, an electromagnetic device operatively connected with the holding pawl for releasing the same and operatively connected with the rotary member of said starting switch means to index the same one step for each release of the holding pawl, electric circuits including said third contact elements and others of the second contact elements and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener.

44. A control system of the character described, comprising, in combination, a base-exchange water softener operatively connected with a source of raw water and a service system, and having a drain connection and operative connection to a source of brine for regeneration of water softening material in the softener, a source of electric current supply, valve means to establish different circulation circuits for the softener in backwashing, salting, and rinsing, electrically operable means for operating said valve means connected with said current source, make and break electrical switch means for rendering said valve operating means operative and inoperative and including a first rotary contactor adapted to be indexed, timing switch means comprising a plurality of angularly spaced contact elements and a second rotary contactor movable toward engagement with said contact elements from a starting position in intermittent step-by-step movements to predetermine the duration of backwashing, salting, and rinsing, means for returning said second rotary contactor to the starting position, a ratchet wheel connected with the second rotary contactor to turn it step-by-step in the forward direction, a holding pawl therefor and an advancing pawl, an electromagnetic device connected to said holding pawl to release the same and operatively connected with the first rotary contactor of said make and break switch means to index the same one step for each release of the holding pawl, electric circuits including said valve operating means current source and the aforesaid contact elements and said make and break switch means and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener.

45. A control system of the character described, comprising, in combination, a base-exchange water softener operatively connected with a source of raw water and a service system, and having a drain connection and operative connection to a source of brine for regeneration of water softening material in the softener, a source of electric current supply, valve means to establish different circulation circuits for the softener in backwashing, salting, and rinsing, electrically operable means for operating said valve means connected with said current source, make and break electrical switch means for rendering said valve operating means operative and inoperative and including a first contactor adapted to be indexed, timing switch means comprising a plurality of contact elements spaced different distances from a starting point and a second contactor movable from the starting point toward these contact elements in intermittent step-by-step movements to predetermine the duration of backwashing, salting and rinsing, means for returning said second contactor to the starting point, ratchet means connected with said second contactor to advance it step-by-step in the forward direction, a holding pawl and an advancing pawl for said ratchet means, an electromagnetic device connected to said holding pawl to release the same and operatively connected with the first contactor of said make and break switch means to index the same one step for each release of the holding pawl, electric circuits including said valve operating means and current source and the aforesaid contact elements and said make and brake switch means and said electromagnetic device, a meter for measuring the flow of water passing through the softener, and means operatively connecting said meter with said advancing pawl intermittently to turn the ratchet wheel step-by-step in a forward direction in proportion to the amount of water passed through the softener, the contact elements cooperating with the second contactor being individually adjustable to different distances from the starting point to accordingly vary and predetermine the duration of backwashing, salting, and rinsing.

CHESTER T. McGILL.
HARRY C. ROWE, JR.

REFERENCES CITED

The following references are of record in the file of this patent:

UNITED STATES PATENTS

| Number | Name | Date |
|---|---|---|
| 1,891,675 | Harwood et al. | Dec. 20, 1932 |
| 1,910,011 | Griswold et al. | May 23, 1933 |
| 1,910,004 | De Ville | May 23, 1933 |
| 1,914,333 | Staegemann | June 13, 1933 |
| 2,012,194 | Hughes | Aug. 20, 1935 |
| 2,051,155 | Staegemann | Aug. 18, 1936 |
| 2,052,515 | Pick | Aug. 25, 1936 |
| 2,162,166 | Gorrien | June 13, 1939 |
| 2,217,822 | Symons | Oct. 15, 1940 |
| 2,310,978 | McGill et al. | Feb. 16, 1943 |
| 2,315,223 | Riche | Mar. 30, 1943 |
| 2,354,694 | McGill et al. | Aug. 1, 1944 |

Certificate of Correction

Patent No. 2,447,520.

August 24, 1948.

CHESTER T. McGILL ET AL.

It is hereby certified that error appears in the printed specification of the above numbered patent requiring correction as follows:

Column 31, line 27, claim 45, for the word "brake" read *break*; and that the said Letters Patent should be read with this correction therein that the same may conform to the record of the case in the Patent Office.

Signed and sealed this 6th day of September, A. D. 1949.

[SEAL]

THOMAS F. MURPHY,
*Assistant Commissioner of Patents.*